United States Patent Office 3,495,660
Patented Feb. 17, 1970

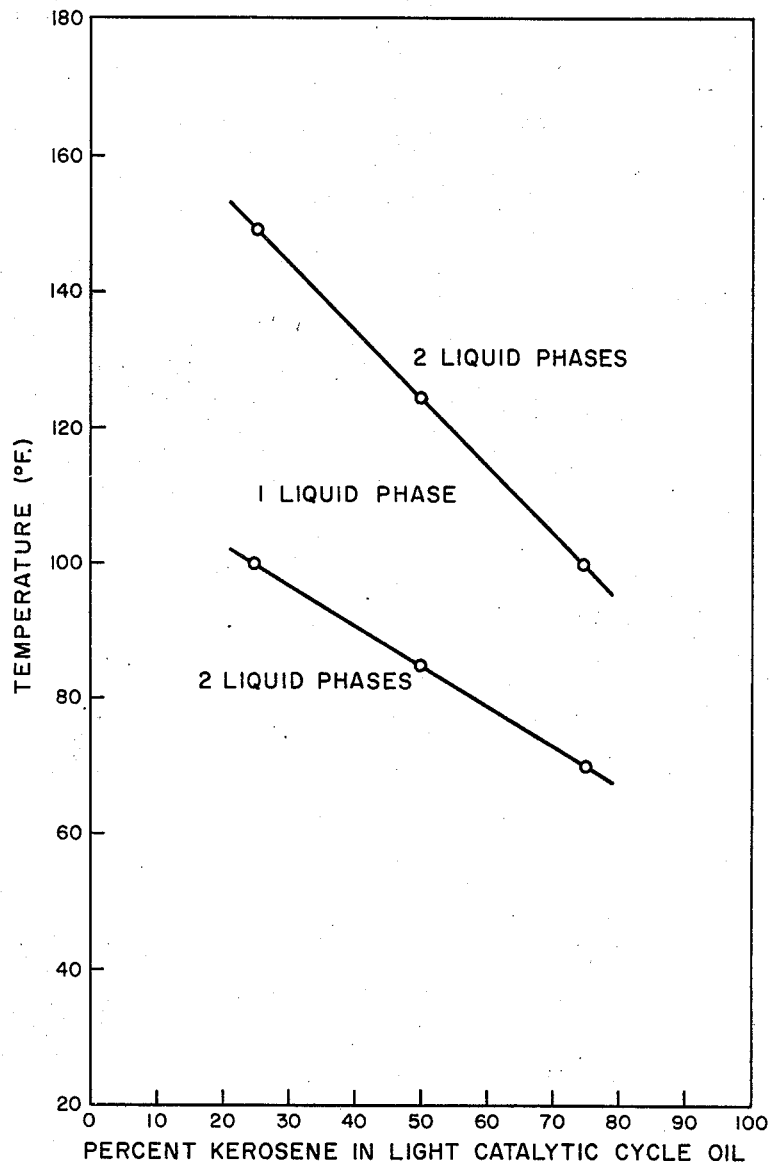
THERMOSTABILITY OF MICELLAR DISPERSION

3,495,660
AROMATICITY INFLUENCING THE THERMO-STABILITY OF MICELLAR DISPERSIONS
John A. Davis, Jr., and William J. Kunzman, Littleton, Colo., assignors to Marathon Oil Company, Findlay, Ohio, a corporation of Ohio
Filed July 22, 1968, Ser. No. 746,391
Int. Cl. E21b 47/06, 43/22
U.S. Cl. 166—252   13 Claims

ABSTRACT OF THE DISCLOSURE

Thermostability of a micellar dispersion containing hydrocarbon, aqueous medium, and surfactant is shifted to higher temperature ranges by increasing the aromaticity of the hydrocarbon within the dispersion. The micellar dispersion can optionally contain cosurfactant and/or electrolyte. Such micellar dispersions are especially useful to recover crude oil in a secondary or tertiary oil recovery process wherein the subterranean reservoir is at a temperature in excess of ambient temperature.

BACKGROUND OF THE INVENTION

Micellar dispersions are useful as miscible-type displacement agents to recover crude oil from subterranean formations. The method of recovery is accomplished by injecting the micellar dispersion into an injection well in fluid communication via the subterranean formation with a producing well and displacing the micellar dispersion through the formation; crude oil is recovered through the producing well. Examples of processes using micellar dispersions are taught in U.S. Patents Nos.: 3,254,-714 to Gogarty et al.; 3,275,075 to Gogarty et al.; 3,266,-570 to Gogarty; and 3,297,084 to Gogarty et al.

Due to the depth and conditions of the reservoir, the reservoir temperature can vary from below about ambient temperature to about 200° F. or more. Generally, the normal subsurface temperature gradient is about 1° F. per 60 feet.

Applicants have discovered that by increasing the aromaticity of the hydrocarbon within the micellar dispersion the thermostability of the micellar dispersion can be increased to higher temperature ranges. However, the micellar dispersion may be unstable at a lower temperature range with the higher aromaticity hydrocarbon. The term "thermostability" as used herein means thermodynamically stable, i.e. a system below or above the thermostability temperature range will exhibit two or more distinct layers or phases, indicating an unstable system or an emulsion.

DESCRIPTION OF THE DRAWING

The drawing illustrates the thermostability of a micellar dispersion dependent on the aromaticity of the hydrocarbon. This micellar dispersion is composed of 57.3% hydrocarbon, 30% water, 10.9% sulfonate (average molecular weight of about 470, about 62% active sulfonate), 1.8% isopropanol and 2.0% sodium sulfate by weight (based on active sulfonate). The hydrocarbon component of the micellar dispersion is composed of kerosene and light catalytic cycle oil; the percents of each indicated on the horizontal axis within the drawing. The light catalytic cycle oil has an aromatic content of about 65% whereas the kerosene has an aromatic content of about 15%. The drawing illustrates, for example, that a hydrocarbon composition of 75% kerosene and 25% light catalytic cycle oil has a thermostability range of 70°–101° F. That is, within this temperature range a single phase region is characteristic. Whenever the aromaticity of the hydrocarbon is increased to 75% light catalytic cycle oil and 25% kerosene, the thermostability range of the micellar dispersion is increased to 100°–150° F. Whenever a 50–50 mixture of the kerosene and light catalytic cycle oil is used in the micellar dispersion, the thermostability range of the dispersion is between the above two temperature ranges, i.e. 85°–125° F.

DESCRIPTION OF THE INVENTION

The term "micellar dispersion" as used herein is meant to include micellar solutions, "micro-emulsions" [Schulman and Montagne, Annals of the New York Academy of Sciences, 92, pages 366–371 (1961)], "transparent" emulsions (Blair, Jr. et al., U.S. Patent No. 2,356,205) and micellar dispersion technology taught by C. G. Sumner, Clayton's, The Theory of Emulsions and Their Technical Treatment, 5th edition, pp. 315–320 (1954). Micellar dispersions differ from emulsions in many ways, the strongest differentiation being that the former are thermodynamically stable whereas the latter are not.

The micellar dispersion is composed of hydrocarbon, aqueous medium, and surfactant sufficient to impart micellar characteristics to the dispersion. Optionally, cosurfactant and/or electrolyte can be incorporated into the dispersion. Examples of volume amounts include from about 4% to about 60% or more of hydrocarbon, from about 20% to about 90% aqueous medium, at least about 4% surfactant, from about 0.01 to about 20% or more of cosurfactant (also identified as semipolar organic compound and as cosolubilizer) and up to about 5% or more by weight (based on the aqueous medium) of electrolyte. In addition, the dispersion can contain other additives such as corrosion and scale inhibitors, bactericides, etc. The micellar dispersions can be oil external or water external. Both are useful in the recovery of crude oil.

Examples of hydrocarbon include crude oil (both sweet and sour) partially refined fractions thereof and refined fractions of crude oil. Specific examples include side cuts from crude columns, crude column overheads, gas oils, kerosene, heavy naphthas, naphthas, straight-run gasoline, and liquefied petroleum gases. Pure hydrocarbons are also useful, e.g. paraffin compounds including propane, pentane, heptane, decane, dodecane, etc.; cycloparaffin compounds including cyclohexane, etc.; aryl compounds including benzene, naphthalene, anthracene, etc.; alkylated products thereof including toluene, alkyl phenols, etc. Examples of preferred aromatic hydrocarbons include product streams from catalytic reformers and preferred cuts of said streams; catalytic cracked hydrocarbon streams such as gasoline LCCO (light catalytic cycle oil), etc.; thermally cracked distillates such as coker distillate, etc.; and hydrocarbons such as benzene, toluene, xylene, cumene, naphthalene, etc. Alkylated aryl compounds are especially useful as the aromatic hydrocarbon. The unsulfonated hydrocarbon (e.g. heavy vacuum gas oils and especially aromatic feed stocks) in petroleum sulfonates is also useful.

The aqueous medium can be soft, brackish, or a brine. Preferably, the water is soft but it can contain small amounts of salts which are compatible with the ions in the subterranean formation being flooded.

Surfactants useful with the dispersions include nonionic, cationic, and anionic surfactants. Examples of such surfactants include sodium glyceryl monolaurate sulfate, dihexyl sodium succinate, hexadecylnaphthalene sulfonate, diethyleneglycol sulfate, glycerol disulfoacetate monomyristate, p-toluidene sulfate laurate, p-chloroaniline sulfate laurate, sodium sulfato oleylethylanilide, triethanolamine myristate, N-methyltaurine oleamide, pentaerythritol monostearate, polyglycerol monolaurate, triethanolamine oleate, morpholine stearate, hexadecyl trimethylammonium chloride, ditetradecyl dimethyl ammonium chloride, n-dodecyl-diethyleneglycol sulfate, monobutylphenyl phenol sodium sulfate, and triethanolamine laurate or triethanolamine oleate. Other useful surfactants include Duponol WAQE (a 30% active sodium lauryl sulfate marketed by Du Pont Chemical Corporation, Wilmington, Del.), Energetic W-100 (a polyoxyethylene alkyl phenol marketed by Armour Chemical Company, Chicago, Ill.), Triton X-100 (an alkylphenoxy polyethoxy ethanol marketed by Rohm & Haas, Philadelphia, Pa.) and Arquad 12-50 (a 50% active dodecyl triemethyl ammonium chloride marketed by Armour Chemical Company, Chicago, Ill.), and like materials.

Petroleum sulfonates are the preferred surfactants useful with the micellar dispersion, they are also known as alkyl aryl naphthenic sulfonates. Such can be obtained by sulfonating at least a portion of a sulfonatable hydrocarbon (e.g. gas oils) and then neutralizing the mixture, e.g. with $NH_4OH$, NaOH, etc. The sulfonate can contain, after extraction, about 60–100% active sulfonate. Examples of preferred surfactants are the sodium and ammonium petroleum sulfonates having an average molecular weight of from about 360 to about 520, and more preferably from about 420 to about 470. The sulfonate can be a mixture of low and high molecular weight sulfonates. Surfactants of like character are also useful.

Examples of cosurfactants include aldehydes, ketones, esters, amino compounds, and alcohols containing from one up to about 20 or more carbon atoms. Preferably, the cosurfactant is an alcohol, e.g., ethanol, isopropanol, n- and isobutanol, the amyl alcohols, 1- and 2-hexanol, 1- and 2-octanol, decyl alcohols, p-nonyl phenol, and alcoholic liquors such as fusel oil. Two or more cosurfactants are useful.

Electrolytes useful in the dispersion include inorganic bases, inorganic acids, inorganic salts, organic bases, organic acids, and organic salts. Examples of electrolytes include those found in U.S. Patents Nos. 3,297,084, and 3,330,343. Preferably, the electrolytes are inorganic acids, inorganic bases, and inorganic salts. Examples of preferable electrolytes include sodium sulfate, sodium chloride, sodium hydroxide, hydrochloric acid, sulfuric acid, and sodium nitrate.

As mentioned previously, the thermostability of the micellar dispersion is shifted to higher temperatures by increasing the aromatic content of the hydrocarbon. By this teaching, reservoir temperatures exceeding ambient temperatures will not adversely influence the stability of the micellar dispersions. That is, the micellar dispersion can be designed to have a thermostability range within the temperature range of the reservoir rock.

The lowest thermostability range of a dispersion of this invention would be one composed of a hydrocarbon having relatively no aromatic content whereas the highest thermostability range of the micellar dispersion would be one composed of a highly aromatic hydrocarbon. It is recognized that the particular surfactant, cosurfactant, and electrolyte will be designed to be compatible with hydrocarbon, reservoir fluids and reservoir rock to obtain a micellar dispersion having desired characteristics. That is to say that the other components within the micellar dispersion will be designed to be compatible with the overall requirements of the particular hydrocarbon and the processing conditions within the flooding operation.

Preferably, the micellar dispersion has a mobility less than that of the formation fluids (crude oil plus formation water) within the reservoir formation. That is, the mobility of the micellar dispersion is preferably about equal to or less than that of the combined mobility of the crude oil and connate water within the reservoir.

It is not intended that the invention be limited by the specifics taught within the specification and appended claims. Rather, equivalents obvious to those skilled in the art should be incorporated within the scope of the overall invention.

What is claimed is:

1. An improved process of recovering crude oil from a subterranean oil-bearing formation wherein a micellar dispersion comprised of hydrocarbon, aqueous medium, and surfactant is injected into the formation through an injection means and displaced through the formation toward a production means to recover crude oil through the production means, the improved process comprising determining the temperature of the formation, increasing the aromaticity of the hydrocarbon within the mixture comprised of hydrocarbon, aqueous medium, and surfactant to obtain a micellar dispersion stable at the temperature of the formation and injecting this dispersion into the formation.

2. The process of claim 1 wherein the temperature of the formation is in excess of about 80° F.

3. The process of claim 1 wherein the temperature of the formation is in excess of about 150° F.

4. The process of claim 1 wherein the temperature of the formation is in excess of about 200° F.

5. The process of claim 1 wherein the micellar dispersion contains cosurfactant.

6. The process of claim 1 wherein the micellar dispersion contains electrolyte.

7. The process of claim 1 wherein the surfactant is a petroleum sulfonate.

8. A method of increasing the thermostability range of a micellar dispersion comprised of hydrocarbon, aqueous medium, and surfactant to higher temperature, the method comprising increasing the aromaticity of the hydrocarbon used to form the micellar dispersion with increasing temperatures.

9. The method of claim 8 wherein the micellar dispersion contains cosurfactant.

10. The method of claim 9 wherein the cosurfactant is alcohol containing from one to about 20 carbon atoms.

11. The method of claim 8 wherein the surfactant is a petroleum sulfonate having an average molecular weight within the range of from about 360 to about 520.

12. The method of claim 8 wherein the aromaticity of the hydrocarbon is obtained by incorporating a light catalytic cycle oil into the dispersion.

13. The method of claim 8 wherein the micellar dispersion contains electrolyte.

References Cited

UNITED STATES PATENTS

| | | | |
|---|---|---|---|
| 3,041,275 | 6/1962 | Lummus et al. | 252—309 X |
| 3,170,514 | 2/1965 | Harvey et al. | 166—275 |
| 3,234,143 | 2/1966 | Waldmann | 252—309 |
| 3,244,638 | 4/1966 | Foley et al. | 252—8.5 X |
| 3,254,714 | 6/1966 | Gogarty et al. | 166—274 |
| 3,266,570 | 8/1966 | Gogarty | 166—273 |
| 3,275,075 | 9/1966 | Gogarty et al. | 166—274 |
| 3,297,084 | 1/1967 | Gogarty et al. | 166—274 X |
| 3,330,343 | 7/1967 | Tosch et al. | 166—274 X |
| 3,348,611 | 10/1967 | Reisberg | 166—274 X |
| 3,373,809 | 3/1968 | Cooke | 166—274 X |

STEPHEN J. NOVOSAD, Primary Examiner

U.S. Cl. X.R.

166—275